United States Patent [19]

Sandler et al.

[11] 4,281,833
[45] Aug. 4, 1981

[54] AUDIO RACQUET BALL

[75] Inventors: Michael E. Sandler; Richard L. Aiani, both of Canoga Park, Calif.

[73] Assignee: Sound Games, Inc., Canoga Park, Calif.

[21] Appl. No.: 890,659

[22] Filed: Mar. 20, 1978

[51] Int. Cl.³ .............................................. A63F 9/00
[52] U.S. Cl. ........................ 273/85 G; 273/DIG. 27
[58] Field of Search ............ 273/85 G, DIG. 28, 1 E, 273/1 GC, DIG. 27; 364/410; 179/1 GP; 340/384 E; 35/35 A; 434/112, 116

[56] References Cited

U.S. PATENT DOCUMENTS

| 3,181,138 | 4/1965 | Anderson | 340/384 E |
|---|---|---|---|
| 3,760,100 | 9/1973 | Ragsdale et al. | 340/384 E |
| 3,800,082 | 3/1974 | Fish | 35/35 A |
| 3,831,172 | 8/1974 | Ohliges et al. | 273/85 G |
| 4,000,489 | 12/1976 | Bench | 340/384 E |
| 4,000,565 | 1/1977 | Overby et al. | 35/35 A |
| 4,026,555 | 5/1977 | Kirschner et al. | 273/85 G |
| 4,086,578 | 4/1978 | Masili | 340/384 E |
| 4,091,234 | 5/1978 | Bristow | 178/18 |
| 4,099,719 | 7/1978 | Dean et al. | 273/DIG. 28 |

Primary Examiner—Richard C. Pinkham
Assistant Examiner—Scott L. Brown
Attorney, Agent, or Firm—Paul H. Ware

[57] ABSTRACT

A non-visual ball and paddle game played through the medium of sound. Ball location, paddle position and playing field are defined by variations of volume, tone, pitch, frequency and stereo separation by means of stereo earphones worn by each player.

19 Claims, 10 Drawing Figures

AUDIO RACQUET BALL

BACKGROUND OF THE INVENTION

1. Field of the Invention

This invention relates generally to electronic games and more particularly to electronic paddle ball games employing auricular stimulation to the exclusion of optical stimulation.

2. Description of the Prior Art

Electronic paddle ball games are known in which a ball represented by a beam of light may be controlled in an enclosed game court by means of paddles, also represented by beams of light. The representative ball is caused to ricochet from the interior of a usually rectangularly shaped playing field, upon which one of the players is required to intercept the representative ball's trajectory by means of manipulating his electronic paddle control in order to control the position of the representative paddle. Interception of this representative ball by the player's representative paddle causes the ball to return to some part of the court in accordance with the laws of elasticity. The game, as described, is thus played through the medium of optical stimulation. Each player sees the trajectory assumed by the ball as it interacts with the side walls of the court or with a player's paddle. The present invention, rather than concerning itself with visual stimulation, contemplates stimulation of the auditory senses such that lateral position and depth are perceived by means of the sense of hearing.

A novelty search, conducted in the United States Patent and Trademark Office relative to the above identified subject matter, developed the following references:

U.S. Pat. Nos. 1,820,357 to Lindstrom et al for: VISION TONE DEVICE 3,800,082 to Fish for: AUDITORY DISPLAY FOR THE BLIND 3,907,434 to Coles for: BINAURAL SIGHT SYSTEM 4,000,565 to Overby et al for: DIGITAL AUDIO OUTPUT DEVICE The field of search included Class 35, subclasses 27 and 35A; Class 178, subclass 7.2; Class 273, subclasses 85R, Digest 27, Digest 28 and Class 340, subclasses 384E and 384R.

Visual electronic paddle ball games have not been specifically cited since they are well known in the art and not considered pertinent to the present invention. It is believed that the development of such a game would be a great advantage in that by such means, the blind would also be enabled to play a game of racquet paddle ball. The enablement of the playing of the blind by no means disadvantages sighted persons in playing the game contemplated by the invention. The present invention contemplates depth and position determination through the medium of sound rather than the medium of sight and, therefore, does not exclude any persons who have the ability to hear.

SUMMARY OF THE INVENTION

It is thus an object of the present invention to provide a game using sound as a medium of conveying information. In particular, it is an object of the present invention to provide an auditory ball and paddle game to be played in a court defined by sound boundaries, and with a ball and paddles defined in terms of sound.

Still another object of the present invention is the provision of a game not requiring the sense of sight for its complete enjoyment.

In the accomplishment of these and other objects, a game is provided in which the medium of sound supplies the primary stimulus, with no visual interaction of the players required. The playing court, the ball and paddles are described in sound and any trajectory assumed by the ball is translated into sound variables communicated to the players. Near and far directions are mechanized as a combination of frequency and volume. As the ball seems to approach the player, the frequency decreases and the sound intensity or volume increases in one embodiment. As the position of the ball moves toward the left, the left channel increases in volume and the right channel decreases and conversely.

In playing the game, the players would be sitting at a box or console having levers to control the positions of the paddles. The two players are each designated "left" and "right" players respectively. On initial turn-on, a two second tone is sent to each player's right ear. This allows the players to check that their stereo earphones are properly affixed, i.e., on the proper ear. After the earphone orientation tone, the unit goes into a pre-game orientation listening mode wherein the ball is allowed to continuously "bounce" around the playing court. This mode allows the players to hear the sound of the traveling and bouncing ball without having to play a game. The ball will continue to "bounce" around the court until the serve button is pressed thus starting a new game. Upon depression of a serve button and after a delay, a tone will sound in either the left or right ear of the players indicating which player is to receive the serve. The ball will then be launched from the back court at a random trajectory determined by a microprocessor. It is to be emphasized that this "launching" is a sound stimulus that indicates the representative position of the "ball" by means of volume, frequency and stereo separation variations, as has been illustrated to the players in the pre-game orientation mode. It is now up to the player who is receiving the serve to intercept it with his "paddle". If he is successful in the interception, the ball "bounces" around the court, that is to say, a sound representation of bouncing around the court will be heard in the earphones and the "sound ball" will come back. Now the other player must intercept the ball with his paddle. When the ball "strikes" the sides of the court, it will make a "bounce" sound and there is a different bounce sound produced for the sides of the court, the far side of the court and the paddle. Thus, some of the positional confusion is eliminated and a contribution to knowing exactly where the ball seems to be through the medium of sound is made. The sound representations of the ball and the paddle are both mixed and the players hear them in both earphones. When a player fails to intercept the trajectory of the ball, a miss sound is heard in the earpiece corresponding to the player who won the point. Thus, the machine assists the players in keeping score. After a point is missed, the system waits for the next depression of the service button to continue play. In the solo or single player mode, the player must intercept the ball each time it approaches the near court.

BRIEF DESCRIPTION OF THE DRAWINGS

Further advantages and features of the present invention will be more fully apparent to those skilled in the art to which the invention pertains from the ensuing detailed descriptions thereof, regarded in conjunction with the accompanying drawings wherein like reference characters refer to like parts throughout and in which.

DETAILED DESCRIPTION

Although specific embodiment of the invention will now be described with reference to the drawing, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
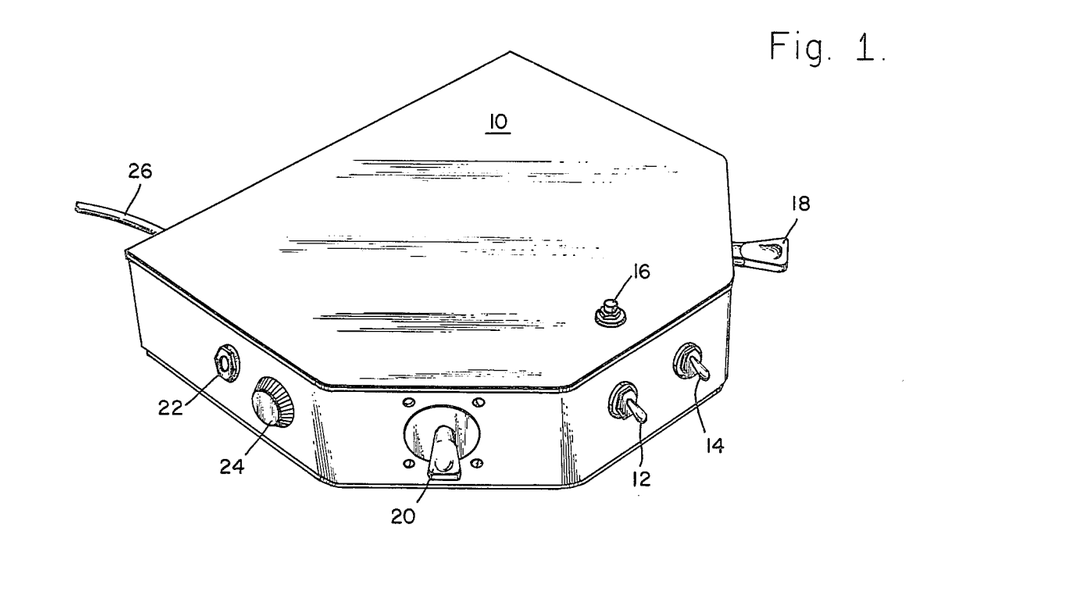
FIG. 1 is a perspective drawing of a console such as might be implemented for the purposes of the present invention.

Referring first to FIG. 1, the external appearance of a housing such as might be used in the practical implementation of the game is illustrated. The console housing is denoted by the numeral 10. A serve button 16 serves the purpose of initiating a game. A first or right player's paddle or racquet control is denoted by the numeral 18, while the second or left player's paddle control is identified by the numeral 20. By using a center detent paddle lever having a two way spring return that applies a restorative force, a tactile feedback is provided thus describing the position of the paddle such that the control is positioned to the center whenever pressure is released. The numeral 12 identifies a power on-off switch while the numeral 14 denotes a function selector switch determining whether the game is to be played in dual or single mode, i.e., with two players or only one, for example. The second player's earphone jack is shown as numeral 22 while the second player's earphone volume control is identified by numeral 24. A power cord, by means of which electrical power may be supplied to the unit has been given the identifying number 26.

Figure 2:
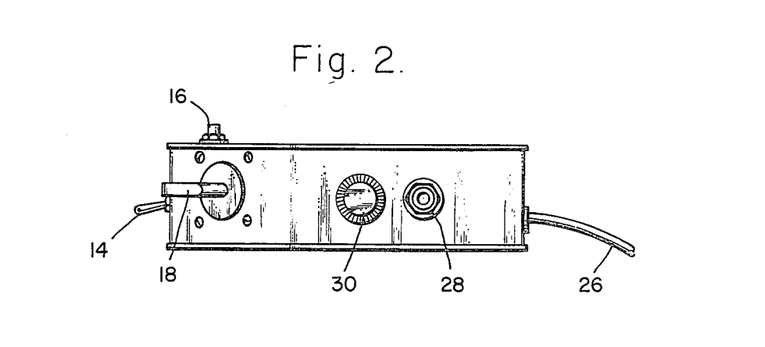
FIG. 2 is a side view in perspective of the console of FIG. 1.

FIG. 2 is a side view in perspective of the console of FIG. 1. Again, the power cord is shown as numeral 26 and the serve button as numeral 16. The first player's earphone volume control and earphone jack, not visible in FIG. 1, are denoted by the numerals 30 and 28 respectively.

Figure 3:
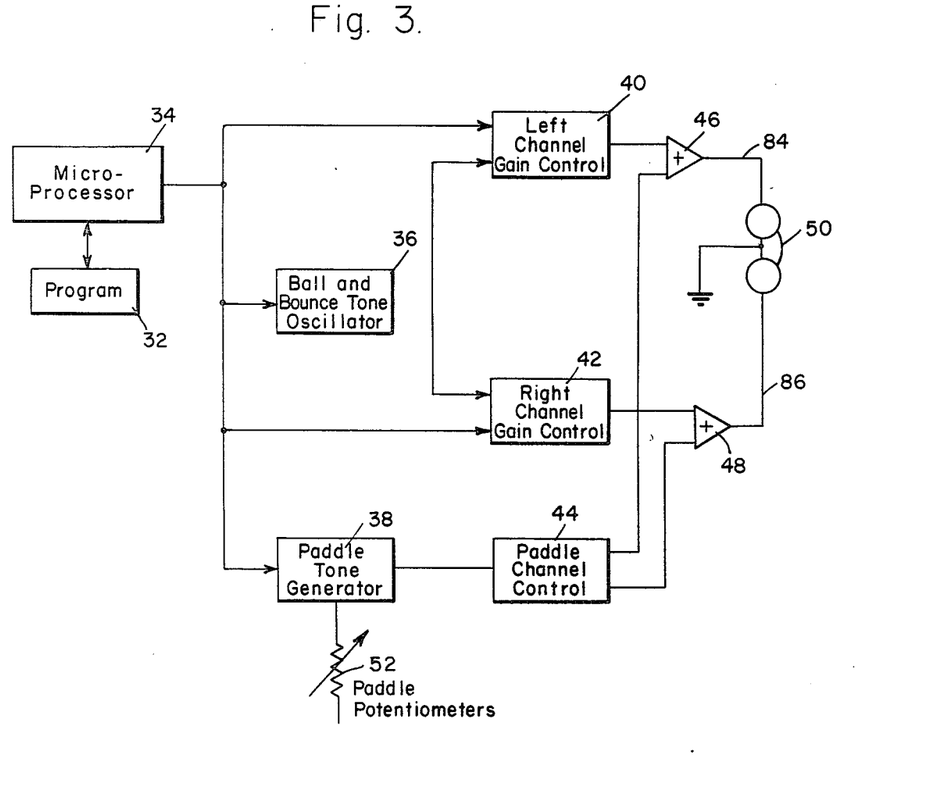
FIG. 3 is a block diagram showing the essential elements of the invention.

FIG. 3 is a conceptual block diagram showing how the essential building blocks of the invention fit together. Microprocessor 34 operates under the control of a stored program 32. These entities control the ball and bounce tone oscillator 36 and left and right channels 40 and 42 respectively, in addition to applying controlling signal information to the paddle tone generator 38. A paddle channel control is denoted by the numeral 44 which, in conjunction with right and left channel controls, furnishes inputs to left and right channel amplifiers 46 and 48 respectively whose outputs are effective to operate earphones 50 by means of the connecting leads 84 and 86. A variable potentiometer 52, serves to control the paddle or racquet.

Figure 4:
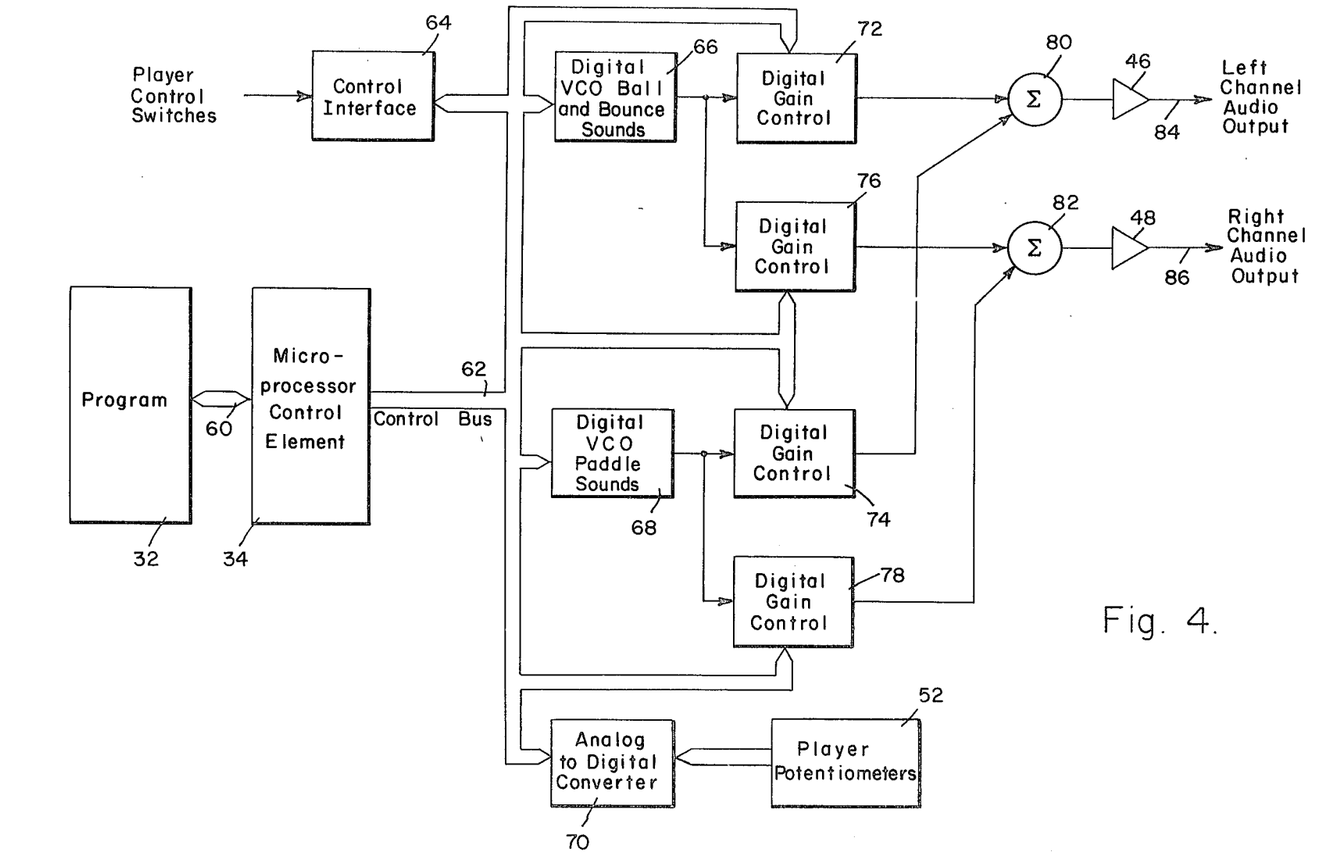
FIG. 4 is an expanded block diagram of the essential elements of the invention.

FIG. 4 is a somewhat expanded block diagram affording a greater detailed explanation of the elements of the invention. As before, a program resident in a read-only-memory (ROM) 32, is fed to a microprocessor control element by means of a connecting link 60. A control bus, denoted by the numeral 62 is effective to distribute the necessary communications and control signals throughout the system. A control interface 64, responds to player controls and switches. An analog-to-digital converter 70 is also responsive to control and processing signals from control elements 64 and microprocessor control element 34. Digital gain controls 72, 74, 76 and 78, to be more fully described in connection with FIG. 9, respond to input signals from the microprocessor control element 34, transmitted by means of control bus 62. These digital gain controls also operate under the influence of digital voltage controlled oscillators, 66 and 68, also to be more fully described in connection with FIG. 10. Output signals from first digital gain control 72 and second digital gain control 74 are furnished to summing circuit 80 which forms a part of left channel control. Likewise, third digital gain control 76 and fourth digital gain control 78 furnish their output signal to summing circuit 82 which is a part of the right channel control. Output signals from summing circuit 80 are furnished to amplifier 46 which in turn furnishes its output signal on a lead 84 as indicated in FIG. 3. Summing circuit 82 furnishes its output signal to amplifier 48 which in turn furnishes its output signals over a lead 86, also as indicated in FIG. 3. As is indicated, the player potentiometers 52, are effective to influence analog-to-digital converter 70.

Figure 5:
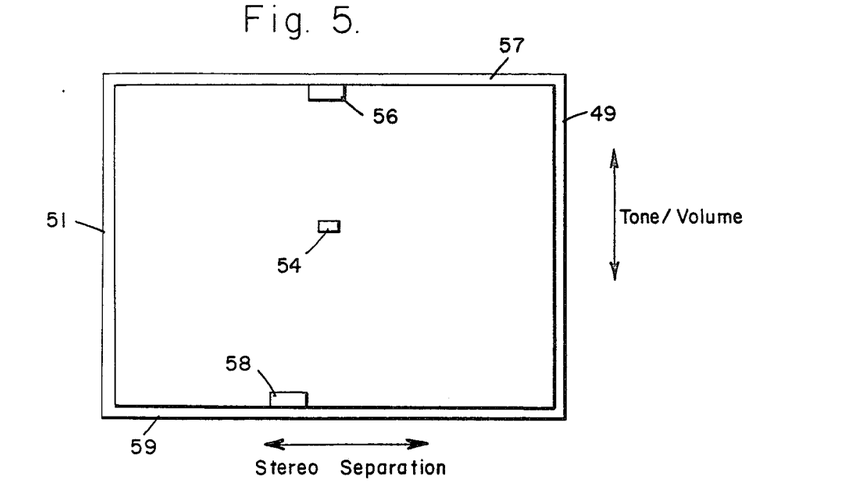
FIG. 5 is a conceptual drawing of a visual analog of the sound-defined entities of the invention.

FIG. 5 presents a conceptual drawing of a visual analog of the sound defined entities as they may be "arranged" in order to play a racquet ball game in the nature of table tennis. Under this arrangement, the players would be aurally "arranged" across the "table" from each other with the first player's paddle position indicated at 56 and movement confined along the first baseline 57. Likewise, the second player's paddle position has been indicated as numeral 58 and its movement will be confined along second baseline 59. A first side boundary has been indicated as numeral 49 and the second side boundary as 51. The ball, indicated as having position 54, may be "bounced" back and forth between the players, with the side boundaries considered as walls as the case would be for enclosed hand-ball, for example.

Figure 6:
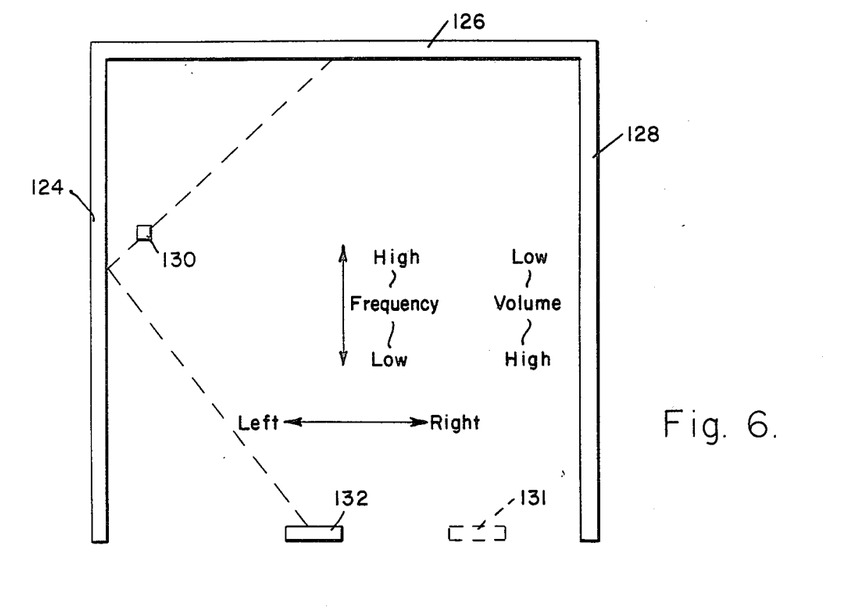
FIG. 6 is an additional conceptual drawing of a visual analog of the sound-defined entities of the invention.

Another possible arrangement is conceptually shown in FIG. 6. As shown, the game in this arrangement may be played by either one or two players. One player's sound racquet has been indicated at numeral 132 with numeral 131 indicating a phantom player's racquet to show that there may, or may not be a second player. One sound side wall has been assigned the identifying numeral 124 while the sound back wall carries the numeral 126 and the other sound side wall the numeral 128. The sound ball position has been indicated as numeral 130. It is further indicated that frequency varies between high and low as the sound ball approaches the near court and the sound intensity or volume also varies from low to high as the ball comes toward the player. The aural effect is of a realistic approach of a missile toward the player, or, when incidence with a side wall is accomplished, a "bounce" sound is received in the player's earphones. It is important to remember that the game is totally played through the medium of sound and that no visual interaction of the players is required. The playing court, the ball and the paddle are defined in terms of sound and the FIGS. 5 and 6 are merely visual analog representations of these sound boundaries as represented in the implementations of the game. With the earphones in place, the left and right directions, from a player's point of perception, are implemented by means of stereo separation. The near and far directions are simulated by a combination of frequency and sound intensity (volume). As the ball "approaches" the player, the frequency decreases and the volume increases. When the ball is missed by either player a miss sound, implemented in the instant embodiment as a long, low, sour beep, is heard by both players. If the right player misses the ball the miss sound will be heard in the left earphone of both players, thus the left player scores a point. If the left player misses, the miss sound will be in the right earphone and the right player scores a point. After the miss sound is heard, in the instant embodiment, the game is silent until the next ball is served, by pressing the serve button. The person who scores the point serves the ball to the other player conventionally. The game automatically serves the ball to the player who missed. Both players will hear a tone signal just prior to the time the ball is served. This tone will sound in the right earphone of both players when the right player is to receive the serve and the left earphone of both players when the left player is to receive the serve.

Figures 7, 8:
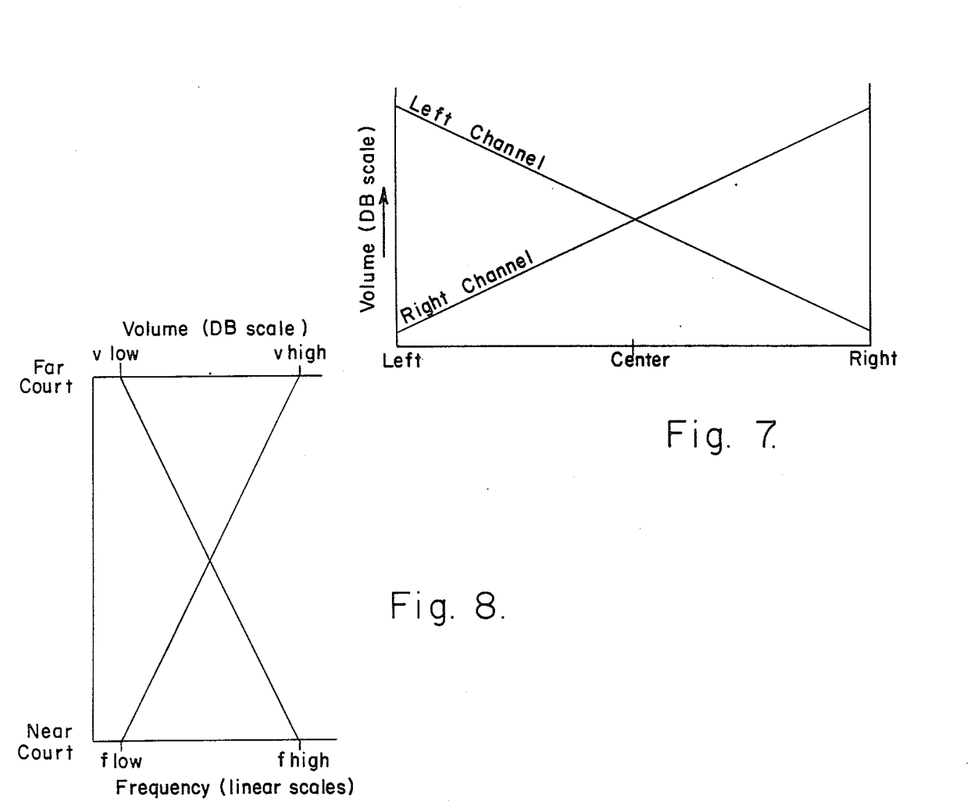
FIG. 7 is an idealized graph showing relationships between sound intensity, plotted as ordinate, versus apparent position plotted as abscissa.
FIG. 8 is a graph describing the relationships involved in sound intensity (volume), across the top scale; distance from a player, along the left side of the figure and frequency, across the bottom scale.

Referring now to FIG. 7, there is shown an idealized graph of how the channel sound intensity in decibels might change with position. As indicated, in the center, there is a cross-over point where both intensities are equal. As movement is simulated toward the left, the left channel increases and the right channel goes down and conversely to the right. The exact shape of the response curve may be a complicated functional dependency upon the response characteristics of the human ear, however, it is not important for our present purposes.

FIG. 8 shows the implementation curves for the near-far directions, i.e., how, as the ball approaches near court or the player's side, the frequency decreases from $f_{high}$ to $f_{low}$ and the intensity or volume, also increases from $v_{low}$ to $v_{high}$. Thus, in playing the game, the first action would be depression of the serve button. After a slight time delay, a tone would be sounded in either the left or right ear of each player, indicating which player is to receive the serve in the case of two players playing the game. The "ball" will then be launched from the back court at a random trajectory, assuming we are using the arrangement of FIG. 6 to play this game, and the player who is receiving the serve will have to intercept it with his paddle as noted supra. As explained above, if he is successful in interception of the ball, it "bounces" around the court and comes back and then the second player has his chance to intercept it. The ball, upon striking the "sides" of the court, makes a "bounce" sound and there is a different bounce sound produced for the sides of the court, vis a vis the far side of the court and also vis a vis the paddle. The ball sound and the paddle sound are mixed in the system and the players hear them both in the earphones. The paddle includes a tactile type of feedback wherein it must be estimated where the ball is going to "hit", and then the control lever must be moved accordingly against its built in restoring force. A feature of "English" has been built into the system, so that if a player moves the sound paddle at the instant before the ball is "hit", it causes a bounce such as would result from a spin being imparted to a physical ball. This feature enhances the enjoyability of the game and allows the development of a certain amount of skill as the game is practiced.

Figure 9:
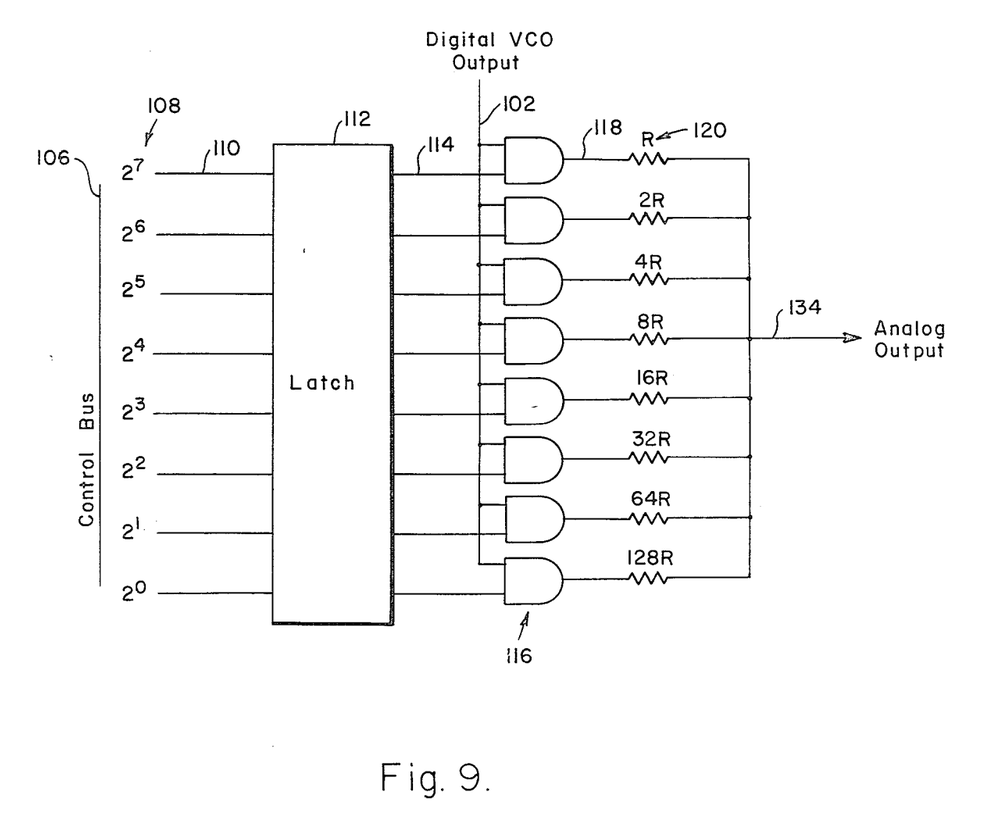
FIG. 9 is a schematic and logic diagram showing an implementation of the digital gain control of FIG. 4.
Figure 10:
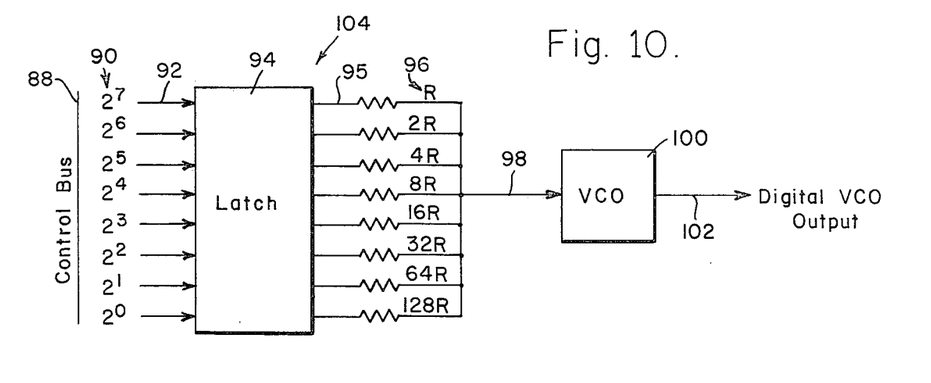
FIG. 10 is a schematic diagram showing an implementation of digital voltage controlled oscillator of FIG. 4.

FIGS. 9 and 10 deal with some of the more detailed implementations of the control mechanisms in the invention shown in block form in FIG. 4. In FIG. 9, a schematic and logic diagram showing an implementation of the digital gain control of FIG. 4, a control bus 106, feeds signals to a power-of-two weighted network 108. The lines of composite lead 110 are indicated as having weights $2^0 = 1$ through $2^7 = 128$. The composite lead 110 furnishes input signal to latch 112. Output from latch 112 is furnished over composite lead 114 to AND function network 116 which also receives an input from a digital voltage controlled oscillator to be further described with reference to FIG. 10 below. Signal output from AND function network 116 is furnished over composite lead 118 to digital-to-analog ladder resistor network 120. The resulting analog output signal then appears on analog output lead 134. This analog output will then be furnished to the appropriate summing circuit 80 or 82 of FIG. 4 showing inputs from four separate circuits of the kind just described herein as digital gain control circuits.

FIG. 10, a schematic diagram showing an implementation of the digital voltage controlled oscillator, describes in somewhat greater detail the operation of that unit shown only as a block in FIG. 4. A control bus 88 furnishes input signal to a power-of-two weighted network 90. Again, the weights are indicated as covering the range $2^0 = 1$ to $2^7 = 128$. Composite lead 92 accepts the output of the power-of-two weighted network and conveys that output to latch 94. Latch 94 supplies its output signal by means of composite lead 95 to digital-to-analog ladder resistor network 96 where the values of the resistors vary from $2^0 \times R$ to $2^7 \times R$. The resulting signal derived in digital-to-analog ladder resistor network 96 is furnished by means of composite lead 98 to voltage controlled oscillator 100. Voltage controlled oscillator 100 furnishes its output signal by means of lead 102 to the digital gain control circuits as shown in FIG. 4.

There has thus been described an auditory ball and paddle game that requires no visual interaction between the players. The game described is played entirely through the medium of sound stimulation and auditory response. It is a game that can be enjoyed by the sighted as well as the non-sighted.

It is here pointed out that although the present invention has been shown and described with reference to particular embodiment, nevertheless, various changes and modifications, obvious to one skilled in the art to which the invention pertains are deemed to lie within the purview of the invention.

What is claimed and desired to be secured by Letters Patent of the United States is:

1. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof;

a power on-off switch mounted on said console housing for furnishing or removing operating power to or from the game;

a function selector switch mounted on said console housing for selecting a mode in which the game is to be played;

a serve button mounted on said console housing by means of which the game is to be initiated and continued;

at least a pair of stereo earphones connected to said console to be worn by the players for the purpose of receiving said form and level of signals utilized in playing the game;

at least a pair of stereo earphone jacks mounted on said console housing and connecting said stereo earphones thereto for use with said stereo earphones to be worn by the players for the purpose of receiving said variable aural stimuli utilized in playing the game;

volume controls mounted on said console housing for adjusting the level of sound intensity in said stereo earphones;

means to generate an orientation tone in said console at initial turn-on of preselected time duration applied into a preselected earpiece of each pair of stereo earphones used in playing the game so as to facilitate the orientation of the earphones correctly upon the ears of the user.

2. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof;

a power on-off switch mounted on said console housing for furnishing or removing operating power to or from the game;

a function selector switch mounted on said console housing for selecting a mode in which the game is to be played;

a serve button mounted on said console housing by means of which the game is to be initiated and continued;

at least a pair of stereo earphones connected to said console to be worn by the players for the purpose of receiving said form and level of signals utilized in playing the game;

at least a pair of stereo earphone jacks mounted on said console housing and connecting said stereo earphones thereto for use with said stereo earphones to be worn by the players for the purpose of receiving said variable aural stimuli utilized in playing the game;

volume controls mounted on said console housing for adjusting the level of sound intensity in said stereo earphones;

means to generate an orientation tone in said console at initial turn-on of preselected time duration applied into a preselected earpiece of each pair of stereo earphones used in playing the game so as to facilitate the orientation of the earphones correctly upon the ears of the user; and a pre-game orientation listening mode initiated immediately following said orientation tone wherein the said game ball is continuously bounced around the court, said pre-game orientation listening mode continuing until the serve button is pressed, thus starting the game.

3. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof;

a power on-off switch mounted on said console housing for furnishing or removing operating power to or from the game;

a function selector switch mounted on said console housing for selecting a mode in which the game is to be played;

a serve button mounted on said console housing by means of which the game is to be initiated and continued;

at least a pair of stereo earphones connected to said console to be worn by the players for the purpose of receiving said form and level of signals utilized in playing the game;

at least a pair of stereo earphone jacks mounted on said console housing and connecting said stereo earphones thereto for use with said stereo earphones to be worn by the players for the purpose of receiving said variable aural stimuli utilized in playing the game;

volume controls mounted on said console housing for adjusting the level of sound intensity in said stereo earphones;

an orientation tone generated in said console at initial turn-on of preselected time duration applied into a preselected earpiece of each pair of stereo earphones used in playing the game so as to facilitate the orientation of the earphones correctly upon the ears of the user; and a serve announcement tone resulting when said serve button is pressed, thereby functioning as a warning to the players that the launching of the game ball in a random trajectory is imminent.

4. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof;

a power on-off switch mounted on said console housing for furnishing or removing operating power to or from the game;

a function selector switch mounted on said console housing for selecting a mode in which the game is to be played;

a serve button mounted on said console housing by means of which the game is to be initiated and continued;

at least a pair of stereo earphones connected to said console to be worn by the players for the purpose of receiving said form and level of signals utilized in playing the game;

at least a pair of stereo earphone jacks mounted on said console housing and connecting said stereo earphones thereto for use with said stereo earphones to be worn by the players for the purpose of receiving said variable aural stimuli utilized in playing the game;

volume controls mounted on said console housing for adjusting the level of sound intensity in said stereo earphones;

means to generate an orientation tone in said console at initial turn-on of preselected time duration applied into a preselected earpiece of each pair of stereo earphones used in playing the game so as to facilitate the orientation of the earphones correctly upon the ears of the user; and a serve announcement tone resulting when said serve button is pressed, being sounded in the right or left ear of the players denoting thereby which player has been designated by said control means to receive service.

5. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof; and wherein said at least one tone oscillator comprises:

a ball tone oscillator having a frequency characteristic of said game ball and variable to define trajectory and positional variations of said game ball;

a bounce tone oscillator having frequency characteristics representative of a recoil of said game ball; and a paddle tone generator characteristic of said game paddle and variable to define positional variations of said game paddle.

6. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof; and wherein said at least one tone oscillator comprises:

a ball tone oscillator having a frequency characteristic of said game ball and variable to define trajectory and positional variations of said game ball;

a bounce tone oscillator having frequency characteristics representative of a recoil of said game ball; and a paddle tone generator characteristic of said game paddle and variable to define positional variations of said game paddle; and wherein additionally said ball tone oscillator, said bounce tone oscillator and said paddle tone generator are digital voltage controlled oscillators.

7. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof; and wherein said control means comprises:

a stored program;

a microprocessor responsive to said stored program;

a left channel gain control responsive to said microprocessor and said at least one tone oscillator;

a right channel gain control responsive to said microprocessor and said at least one tone oscillator; and a paddle channel control responsive to said at least one tone oscillator.

8. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof; and wherein said control means comprises:

a stored program;

a microprocessor responsive to said stored program;

a left channel gain control responsive to said microprocessor and said at least one tone oscillator;

a right channel gain control responsive to said microprocessor and said at least one tone oscillator; and a paddle channel control responsive to said at least one tone oscillator; and wherein additionally said left channel gain control responsive to said microprocessor and said at least one tone oscillator comprises:

at least a first pair of digital gain control circuits;

at least a first summing circuit responsive to signal output from said at least a first pair of digital gain control circuits and wherein said right channel gain control responsive to said microprocesor and said at least one tone oscillator comprises in addition:

at least a second pair of digital gain control circuits; and at least a second summing circuit responsive to signal output from said at least a second pair of digital gain control circuits.

9. An aural paddle ball game where physical boundaries and game elements are defined in terms of sound analogs, comprising:

a playing court having aurally defined boundaries;

an aurally defined game ball to be manipulated about said playing court within said boundaries;

at least one aurally defined game paddle with which to effect manipulation of said game ball about said playing court;

at least one manual paddle control lever by means of which said game paddle may be controllably positioned;

at least one tone oscillator to provide variable aural stimuli utilized in playing the game;

control means governing the variations in aural stimuli and the flow of information in said game;

signal processing means for providing the form and level of aural signals used in playing the game;

control interface means providing signal communication between externally generated manual signals and said control means;

a console housing containing game elements and providing supportive structure for manipulatable elements thereof; and wherein said control means comprises:

a stored program;

a microprocessor responsive to said stored program;

a left channel gain control responsive to said microprocessor and said at least one tone oscillator;
a right channel gain control responsive to said microprocessor and said at least one tone oscillator; and
a paddle channel control responsive to said at least one tone oscillator; and wherein additionally
said left channel gain control responsive to said microprocessor and said at least one tone oscillator comprises:
at least a first pair of digital gain control circuits;
at least a first summing circuit responsive to signal output from said at least a first pair of digital gain control circuits and wherein said right channel gain control responsive to said microprocessor and said at least one tone oscillator comprises in addition:
at least a second pair of digital gain control circuits; and
at least a second summing circuit responsive to signal output from said at least a second pair of digital gain control circuits; and where still further
said paddle channel control responsive to said at least one tone oscillator itself comprises:
a variable resistance potentiometer controlled by said at least one manual paddle control lever; and
an analog-to-digital converter responsive to said variable resistance potentiometer.

10. An aural paddle ball game where physical boundaries and game elements are defined in terms of sound analogs, comprising:
a playing court having aurally defined boundaries;
an aurally defined game ball to be manipulated about said playing court within said boundaries;
at least one aurally defined game paddle with which to effect manipulation of said game ball about said playing court;
at least one manual paddle control lever by means of which said game paddle may be controllably positioned;
at least one tone oscillator to provide variable aural stimuli utilized in playing the game;
control means governing the variations in aural stimuli and the flow of information in said game;
signal processing means for providing the form and level of aural signals used in playing the game;
control interface means providing signal communication between externally generated manual signals and said control means;
a console housing containing game elements and providing supportive structure for manipulatable elements thereof; and wherein
said control means comprises:
a stored program;
a microprocessor responsive to said stored program;
a left channel gain control responsive to said microprocessor and said at least one tone oscillator;
a right channel gain control responsive to said microprocessor and said at least one tone oscillator; and
s paddle channel control responsive to said at least one tone oscillator; and wherein additionally
said left channel gain control responsive to said microprocesssor and said at least one tone oscillator comprises:
at least a first pair of digital gain control circuits;
at least a first summing circuit responsive to signal output from said at least a first pair of digital gain control circuits and wherein said right channel gain control responsive to said microprocessor and said at least one tone oscillator comprises in addition;
at least a second pair of digital gain control circuits; and
at least a second summing circuit responsive to signal output from said at least a second pair of digital gain control circuits,
said paddle channel control responsive to said at least one tone oscillator itself comprises:
a variable resistance potentiometer controlled by said at least one manual paddle control lever; and
an analog-to-digital converter responsive to said variable resistance potentiometer; and further wherein
said at least a first summing circuit furnishes its output signal to a first signal processing means.

11. An aural paddle ball game where physical boundaries and game elements are defined in terms of sound analogs, comprising:
a playing court having aurally defined boundaries;
an aurally defined game ball to be manipulated about said playing court within said boundaries;
at least one aurally defined game paddle with which to effect manipulation of said game ball about said playing court;
at least one manual paddle control lever by means of which said game paddle may be controllably positioned;
at least one tone oscillator to provide variable aural stimuli utilized in playing the game;
control means governing the variations in aural stimuli and the flow of information in said game;
signal processing means for providing the form and level of aural signals used in playing the game;
control interface means providing signal communication between externally generated manual signals and said control means;
a console housing containing game elements and providing supportive structure for manipulatable elements thereof; and wherein
said control means comprises:
a stored program;
a microprocessor responsive to said stored program;
a left channel gain control responsive to said microprocessor and said at least one tone oscillator;
a right channel gain control responsive to said microprocessor and said at least one tone oscillator; and
a paddle channel control responsive to said at least one tone oscillator; and wherein additionally
said left channel gain control responsive to said microprocessor and said at least one tone oscillator comprises:
at least a first pair of digital gain control circuits;
at least a first summing circuit responsive to signal output from said at least a first pair of digital gain control circuits and wherein said right channel gain control responsive to said microprocessor and said at least one tone oscillator comprises in addition:
at least a second pair of digital gain control circuits; and
at least a second summing circuit responsive to signal output from said at least a second pair of digital gain control circuits,
said paddle channel control responsive to said at least one tone oscillator itself comprises:
a variable resistance potentiometer controlled by said at least one manual paddle control lever; and
an analog-to-digital converter responsive to said variable resistance potentiometer; and further wherein
said at least a first summing circuit furnishes its output signal to a first signal processing means and wherein said first signal processing means is an amplifier.

12. An aural paddle ball game where physical boundaries and game elements are defined in terms of sound analogs, comprising:
a playing court having aurally defined boundaries;
an aurally defined game ball to be manipulated about said playing court within said boundaries;
at least one aurally defined game paddle with which to effect manipulation of said game ball about said playing court;
at least one manual paddle control lever by means of which said game paddle may be controllably positioned;
at least one tone oscillator to provide variable aural stimuli utilized in playing the game;
control means governing the variations in aural stimuli and the flow of information in said game;
signal processing means for providing the form and level of aural signals used in playing the game;
control interface means providing signal communication between externally generated manual signals and said control means;
a console housing containing game elements and providing supportive structure for manipulatable elements thereof; and wherein
said control means comprises:
a stored program;
a microprocessor responsive to said stored program;
a left channel gain control responsive to said microprocessor and said at least one tone oscillator;
a right channel gain control responsive to said microprocessor and said at least one tone oscillator; and
a paddel channel control responsive to said at least one tone oscillator; and wherein additionally
said left channel gain control responsive to said microprocessor and said at least one tone oscillator comprises:
at least a first pair of digital gain control circuits;
at least a first summing circuit responsive to signal output from said at least a first pair of digital gain control circuits and wherein said right channel gain control responsive to said microprocessor and said at least one tone oscillator comprises in addition;
at least a second pair of digital gain control circuits; and
at least a second summing circuit responsive to signal output from said at least a second pair of digital gain control circuits,
said paddle channel control responsive to said at least one tone oscillator itself comprises:
a variable resistance potentiometer controlled by said at least one manual paddle control lever; and
an analog-to-digital converter responsive to said variable resistance potentiometer; and further wherein
said at least a first summing circuit furnishes its output signal to a first signal processing means and wherein said first signal processing means is an amplifier; and
wherein said at least a second summing circuit furnishes its output signal to a second signal processing means.

13. An aural paddle ball game where physical boundaries and game elements are defined in terms of sound analogs, comprising:
a playing court having aurally defined boundaries;
an aurally defined game ball to be manipulated about said playing court within said boundaries;
at least one aurally defined game paddle with which to effect manipulation of said game ball about said playing court;
at least one manual paddle control lever by means of which said game paddle may be controllably positioned;
at least one tone oscillator to provide variable aural stimuli utilized in playing the game;
control means governing the variations in aural stimuli and the flow of information in said game;
signal processing means for providing the form and level of aural signals used in playing the game;
control interface means providing signal communication between externally generated manual signals and said control means;
a console housing containing game elements and providing supportive structure for manipulatable elements thereof; and wherein
said control means comprises:
a stored program;
a microprocessor responsive to said stored program;
a left channel gain control responsive to said microprocessor and said at least one tone oscillator;
a right channel gain control responsive to said microprocessor and said at least one tone oscillator; and
a paddle channel control responsive to said at least one tone oscillator; and wherein additionally
said left channel gain control responsive to said microprocessor and said at least one tone oscillator comprises:
at least a first pair of digital gain control circuits;
at least a first summing circuit responsive to signal output from said at least a first pair of digital gain control circuits and wherein said right channel gain control responsive to said microprocessor and said at least one tone oscillator comprises in addition;
at least a second pair of digital gain control circuits; and
at least a second summing circuit responsive to signal output from said at least a second pair of digital gain control circuits,
said paddle channel control responsive to said at least one tone oscillator itself comprises:
a variable resistance potentiometer controlled by said at least one manual paddle control lever; and
an analog-to-digital converter responsive to said variable resistance potentiometer; and further wherein
said at least a first summing circuit furnishes its output signal to a first signal processing means and wherein said first signal processing means is an amplifier; and
wherein said at least a second summing circuit furnishes its output signal to a second signal processing means and wherein said second signal processing means is an amplifier.

14. An aural paddle ball game operated under the control of a microprocessor wherein said microprocessor comprises:
means for defining physical boundaries in terms of sound analogs;
means for defining game elements in terms of sound analogs; and
means for defining motion of said game elements in terms of sound analogs;
means to select game modes in terms of sound analogs; and wherein said means for defining game elements comprises:

means for defining a game ball to be manipulated within said physical boundaries; and means defining at least one game paddle with which to effect manipulation of said game ball.

15. An aural paddle ball game operated under the control of a microprocessor wherein said microprocessor comprises:

means for defining physical boundaries in terms of sound analogs;

means for defining game elements in terms of sound analogs; and means for defining motion of said game elements in terms of sound analogs;

means to select game modes in terms of sound analogs; and wherein said means for defining game elements comprises:

means for defining a game ball to be manipulated within said physical boundaries; and means defining at least one game paddle with which to effect manipulation of said game ball and wherein additionally said means for defining motion of said game elements comprises:

means to produce a frequency characteristic of said game ball;

means to vary said frequency characteristic of said game ball so as to define trajectory and positional variations of said game ball;

means to define a bounce tone characteristic of recoil of said game ball from said boundaries or said paddle;

means to produce a frequency characteristic of said game paddle;

means to vary said frequency characteristic of said game paddle to define positional variation thereof.

16. An aural paddle ball game operated under the control of a microprocessor wherein said microprocessor comprises:

means for defining physical boundaries in terms of sound analogs;

means for defining game elements in terms of sound analogs; and means for defining motion of said game elements in terms of sound analogs;

means to select game modes in terms of sound analogs; and wherein said means for defining game elements comprises:

means for defining a game ball to be manipulated within said physical boundaries; and means defining at least one game paddle with which to effect manipulation of said game ball and wherein additionally said means for defining motion of said game elements comprises:

means to produce a frequency characteristic of said game ball;

means to vary said frequency characteristic of said game ball so as to define trajectory and positional variations of said game ball;

means to define a bounce tone characteristic of recoil of said game ball from said boundaries or said paddle;

means to produce a frequency characteristic of said game paddle;

means to vary said frequency characteristic of said game paddle to define positional variation thereof; and further wherein;

said means for defining motion of said game elements comprises:

a decrease in frequency coupled with an increase in intensity to denote an approaching ball;

an increase in frequency coupled with a decrease in intensity to denote a receding ball;

an increase in the intensity of a left stereo channel coupled with a decrease in the intensity of a right stereo channel to denote a ball travelling toward the left;

an increase in the intensity of the right stereo channel coupled with a decrease in the intensity of the left stereo channel to denote a ball travelling toward the right;

a distinctive bounce sould denoting the striking of a court boundary by the ball, each such court boundary producing its own distinctive sound;

a bounce sound for the ball striking a player's paddle distinctive from the bounce sound heard when the ball strikes a court boundary;

a miss sound occurring when a player fails to intercept the trajectory of the ball thereby occasioning a score to another player, said miss sound being appropriate to act as a score indicator.

17. An aural paddle ball game operated under the control of a microprocessor wherein said microprocessor comprises:

means for defining physical boundaries in terms of sound analogs;

means for defining game elements in terms of sound analogs; and means for defining motion of said game elements in terms of sound analogs;

means to select game modes in terms of sound analogs; and wherein said means for defining game elements comprises:

means for defining a game ball to be manipulated within said physical boundaries; and means defining at least one game paddle with which to effect manipulation of said game ball and wherein additionally said means for defining motion of said game elements comprises:

means to produce a frequency characteristic of said game ball;

means to vary said frequency characteristic of said game ball so as to define trajectory and positional variations of said game ball;

means to define a bounce tone characteristic of recoil of said game ball from said boundaries or said paddle;

means to produce a frequency characteristic of said game paddle;

means to vary said frequency characteristic of said game paddle to define positional variation thereof; and further wherein;

said means for defining motion of said game elements comprises:

a decrease in frequency coupled with an increase in intensity to denote an approaching ball;

an increase in frequency coupled with a decrease in intensity to denote a receding ball;

an increase in the intensity of a left stereo channel coupling with a decrease in the intensity of a right stereo channel to denote a ball travelling toward the left;

an increase in the intensity of the right stereo channel coupled with a decrease in the intensity of the left stereo channel to denote a ball travelling toward the right;

a distinctive bounce sould denoting the striking of a court boundary by the ball, each such court boundary producing its own distinctive sound;

a bounce sound for the ball striking a player's paddle distinctive from the bounce sound heard when the ball strikes a court boundary;

a miss sound occurring when a player fails to intercept the trajectory of the ball thereby occasioning a score to another player, said miss sound being appropriate to act as a score indicator; and wherein further said means to select game modes comprises:

orientation tone means wherein initial turn-on results in the application of an orientation tone of preselected time duration into a preselected earphone of each player;

pre-game orientation listening mode means initiated immediately following said orientation tone by said microprocessor wherein the ball is continuously bounced around said physical boundaries;

player initiated serve announcement tone means operable to terminate said pre-game orientation listening mode means and functioning as a warning to players that launching of the game ball in a random trajectory is imminent.

18. An aural paddle ball game operated under the control of a microprocessor wherein said microprocessor comprises:

means for defining physical boundaries in terms of sound analogs;

means for defining game elements in terms of sound analogs; and means for defining motion of said game elements in terms of sound analogs;

means to select game modes in terms of sound analogs; and wherein said means for defining game elements comprises:

means for defining a game ball to be manipulated within said physical boundaries; and means defining at least one game paddle with which to effect manipulation of said game ball and wherein additionally said means for defining motion of said game elements comprises:

means to produce a frequency characteristic of said game ball;

means to vary said frequency characteristic of said game ball so as to define trajectory and positional variations of said game ball;

means to define a bounce tone characteristic of recoil of said game ball from said boundaries or said paddle;

means to produce a frequency characteristic of said game paddle;

means to vary said frequency characteristic of said game paddle to define positional variation thereof; and further wherein;

said means for defining motion of said game elements comprises:

a decrease in frequency coupled with an increase in intensity to denote an approaching ball;

an increase in frequency coupled with a decrease in intensity to denote a receding ball;

an increase in the intensity of a left stereo channel coupled with a decrease in the intensity of a right stereo channel to denote a ball travelling toward the left;

an increase in the intensity of the right stereo channel coupled with a decrease in the intensity of the left stereo channel to denote a ball travelling toward the right;

a distinctive bounce sould denoting the striking of a court boundary by the ball, each such court boundary producing its own distinctive sound;

a bounce sound for the ball striking a player's paddle distinctive from the bounce sound heard when the ball strikes a court boundary;

a miss sound occurring when a player fails to intercept the trajectory of the ball thereby occasioning a score to another player, said miss sound being appropriate to act as a score indicator; and wherein further said means to select game modes comprises:

orientation tone means wherein initial turn-on results in the application of an orientation tone of preselected time duration into a preselected earphone of each player;

pre-game orientation listening mode means initiated immediately following said orientation tone by said microprocessor wherein the ball is continuously bounced around said physical boundaries;

player initiated serve announcement tone means operable to terminate said pre-game orientation listening mode means and functioning as a warning to players that launching of the game ball in a random trajectory is imminent and further wherein said serve announcement tone means sounds in the right or left earphone of the players denoting thereby which player has been designated by said control means to receive service.

19. An aural paddle ball game operated under the control of a microprocessor wherein said microprocessor comprises:

means for defining physical boundaries in terms of sound analogs;

means for defining game elements in terms of sound analogs; and means for defining motion of said game elements in terms of sound analogs;

means to select game modes in terms of sound analogs; and wherein said means for defining game elements comprises:

means for defining a game ball to be manipulated within said physical boundaries; and means defining at least one game paddle with which to effect manipulation of said game ball and wherein additionally said means for defining motion of said game elements comprises:

means to produce a frequency characteristic of said game ball;

means to vary said frequency characteristic of said game ball so as to define trajectory and positional variations of said game ball;

means to define a bounce tone characteristic of recoil of said game ball from said boundaries or said paddle;

means to produce a frequency characteristic of said game paddle;

means to vary said frequency characteristic of said game paddle to define positional variation thereof; and further wherein;

said means for defining motion of said game elements comprises:

a decrease in frequency coupled with an increase in intensity to denote an approaching ball;

an increase in frequency coupled with a decrease in intensity to denote a receding ball;

an increase in the intensity of a left stereo channel coupled with a decrease in the intensity of a right stereo channel to denote a ball travelling toward the left;

an increase in the intensity of the right stereo channel coupled with a decrease in the intensity of the left stereo channel to denote a ball travelling toward the right;

a distinctive bounce sould denoting the striking of a court boundary by the ball, each such court boundary producing its own distinctive sound;

a bounce sound for the ball striking a player's paddle distinctive from the bounce sound heard when the ball strikes a court boundary;

a miss sound occurring when a player fails to intercept the trajectory of the ball thereby occasioning a score to another player, said miss sound being appropriate to act as a score indicator; and wherein further said means to select game modes comprises:

orientation tone means wherein initial turn-on results in the application of an orientation tone of preselected time duration into a preselected earphone of each player;

pre-game orientation listening mode means initiated immediately following said orientation tone by said microprocessor wherein the ball is continuously bounced around said physical boundaries;

player initiated serve announcement tone means operable to terminate said pre-game orientation listening mode means and functioning as a warning to players that launching of the game ball in a random trajectory is imminent and further wherein said serve announcement tone means sounds in the right or left earphone of the players denoting thereby which player has been designated by said control means to receive service; and wherein said means to select game modes includes a miss sound that occurs in the earphone of all players corresponding to the player who won a point.

* * * * *